March 15, 1955
R. HOUDART
2,704,223
OPERATING MECHANISM FOR TELESCOPIC
BODIES FOR VEHICLES
Filed Feb. 27, 1951
3 Sheets-Sheet 1
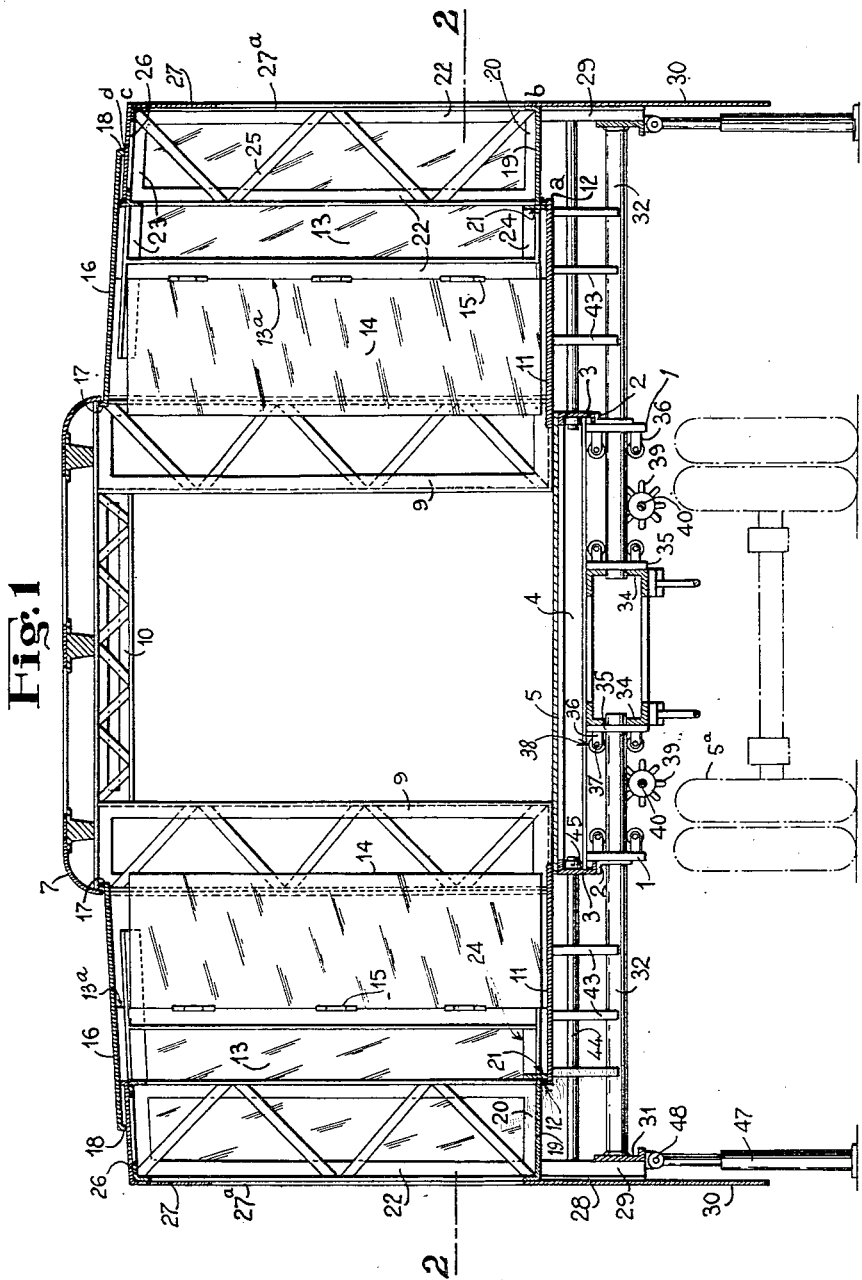
INVENTOR:
ROBERT HOUDART
BY
Richardson, David and Nordon
ATTYS March 15, 1955  R. HOUDART  2,704,223
OPERATING MECHANISM FOR TELESCOPIC
BODIES FOR VEHICLES
Filed Feb. 27, 1951  3 Sheets-Sheet 2
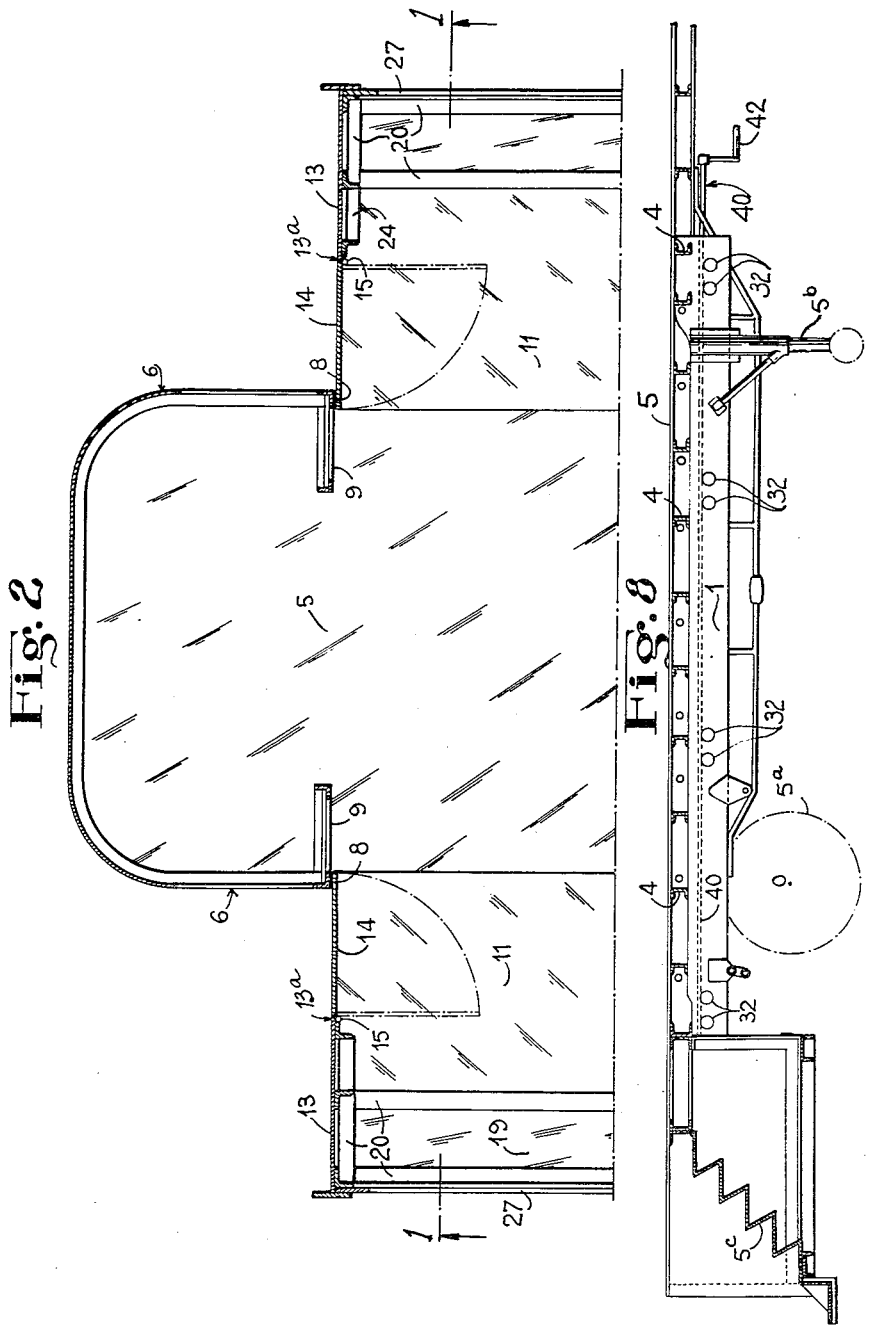
INVENTOR:
ROBERT HOUDART
By
Richardson, David and Nordon
ATTYS

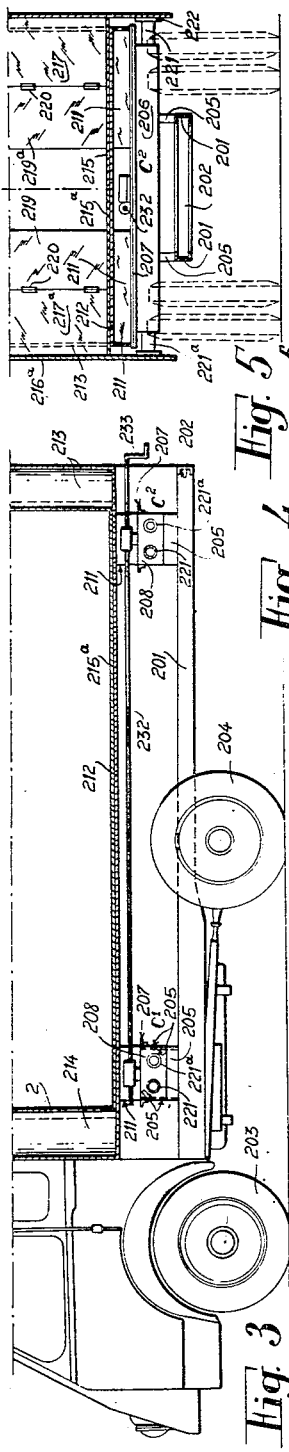

United States Patent Office 2,704,223
Patented Mar. 15, 1955

2,704,223

OPERATING MECHANISM FOR TELESCOPIC BODIES FOR VEHICLES

Robert Houdart, Dijon, France

Application February 27, 1951, Serial No. 212,861

Claims priority, application France October 4, 1950

1 Claim. (Cl. 296—26)

The present invention relates to vehicles, and in particular to motor vehicles, such as lorries, vans and their trailers, which more particularly can be employed as shops, display windows, travelling workshops and the like.

In the usual vehicles of this nature it is generally necessary, when the vehicle has reached the site where the sale, display, work or the like is to take place, to proceed with the erection, outside of the vehicle, of boards or planks mounted on trestles, on which the goods can be exposed or the work can be carried out. The material necessary for this purpose requires to be carried by the vehicle additionally to the merchandise, tools or the like, which reduces by this amount the useful load-carrying capacity of the vehicle.

Furthermore, unless an additional installation of protective awnings is provided, the goods, tools or the like are exposed to the sun or inclemencies of the weather when being sold or used.

The invention has for its object an improved vehicle, either driving unit or trailer, which enables the disadvantages aforesaid to be overcome and complies with the stated requirements.

The invention has also for its object a vehicle the body of which comprises a fixed portion supported by the longitudinal members of a chassis or frame and at least one portion movable on said fixed portion, in such a way as to be capable of being opened out beyond the normal volume possessed by this body in the travelling position.

In the accompanying drawings, given solely as an example:

Fig. 1 is a transverse section of a trailer according to the invention, along the line I—I of Fig. 2, in the opened position;

Fig. 2 is a plan section of the front part of the trailer, along the line 2—2 of Fig. 1;

Fig. 3 is a diagrammatic sectional view in elevation taken along the line 3—3 in Fig. 4 of a further embodiment of vehicle according to the invention;

Fig. 4 is a plan view, in which the fixed portion and the movable portions of the body are shown merely in part;

Fig. 5 is a similar, vertical cross-section taken along the line 5—5 in Fig. 4;

Fig. 6 shows, to enlarged scale, a part vertical cross-section taken along the line 6—6 in Fig. 4;

Fig. 7 is a very diagrammatic view in plan of a still further embodiment of vehicle according to the invention.

Figure 8 is a side elevation of the chassis of the vehicle.

According to the embodiment illustrated in Figs. 3 to 6, the motor vehicle comprises a usual form of chassis consisting of two longitudinal bearers 201 suitably connected by transverse bearers 202. This chassis rests on front supporting and steering wheels 203 and rear driving wheels 204.

On the chassis there are mounted transversely by means of blocks 205 two box-like structures $C^1$ and $C^2$. Each of these box-like structures is formed of two longitudinal vertical walls 206 reinforced along their upper edges by angle pieces 207 and connected together by two vertical end plates 208 and a number of intermediate vertical bracing plates 209, the whole being stiffened by stays 210.

On the box-like structures there is mounted, in a position which is elevated, owing for example to supporting blocks 211, the usual floor 212 of the body. Beyond the floor, which extends over the entire chassis, the body is limited to two vertical portions, one 213 at the rear and the other 214 at the front, and to a roof portion (not shown), which covers the whole and connects together the two portions 213 and 214.

In the shell thus formed are mounted, capable of sliding transversely, two movable portions. Each of these comprises a floor 215 or $215^a$, a vertical longitudinal wall 216 or $216^a$, and vertical end walls 217, 218, $217^a$, $218^a$. The end walls are limited to a fraction of the width of the vehicle and are extended by portions 219, $219^a$, which are mounted on hinges 220 in such a manner that they do not obstruct longitudinal movement in the vehicle when the two folding portions are returned to their folded position.

These portions are supported and controlled in their displacement, opposite each box-like structure $C^1$ and $C^2$ by a transverse tube 221, $221^a$, to which the said portion is connected through the medium of a plate, such as 222. The two tubes, arranged as a pair within the same box-like structure are movable longitudinally in this box-like structure, where they are guided by a plurality of sets of rollers 223. These tubes possess over practically their entire length regularly spaced apertures 224, $224^a$ (Fig. 6), the centres of which are situated on the two generatrices which are nearest to one another in the horizontal plane A—A passing through the axes of the tubes. The latter accordingly form indeed two racks, with which there meshes a gear wheel 225. This wheel is keyed on to a vertical spindle 226, which is rotatable in bearings 227 and 228 carried by a casing 229 supported by the box-like structure. At the upper part of this casing, on the spindle 226, there is keyed a wheel 230 meshing with a worm screw 231. The two worm screws 231 pertaining to the two box-like structures $C^1$ and $C^2$ are keyed on to a longitudinal shaft 232, which can be operated in one or the other direction by the aid of a removable crank 233.

As will be appreciated, it is sufficient to rotate the two spindles 226 in the direction of the arrows $f^1$ (Fig. 4) for the purpose of moving the two tubes 221 and $221^a$ simultaneously in opposition to one another in the directions of the arrows $f^2$ and $f^3$ and thus opening out laterally the two movable portions of the body, while rotation in the opposite direction will ensure their return into the position according to Fig. 5.

A single crank 233, a single shaft 232 and a single worm 231 in respect of each box-like structure accordingly permit of operation of the two movable portions of the body.

In Fig. 7 there is shown very diagrammatically a further embodiment in which in each of the box-like structures $C^1$ and $C^2$ the two tubes $221^b$ and $221^c$ are each controlled by a different wheel $225^b$, $225^c$. Each wheel is caused to be rotated by one of two shafts $232^b$ or $232^c$.

In this case the advantages derived from the box-like structures $C^1$ and $C^2$ are still maintained, but there is no longer obtained the benefit, from the point of view of weight and rapidity of operation, of the single form of control. On the other hand the possibility is provided of operating the two movable portions of the body individually; which may be very useful in certain cases.

Naturally, the invention is in no way limited to the embodiments illustrated and described, which have been selected solely by way of example.

Thus, in the example illustrated in Figure 1, the operation of the shafts 40 is effected by hand, but this operation may naturally be effected mechanically, electrically or pneumatically; it may be individual in respect of each of the shafts 40 or it may be effected by sprocket wheels and gears which reverse the direction of rotation of the right-hand and left-hand shafts. The chains may be driven by a reducing gear, which in turn is driven by an electric motor fed by a battery of accumulators of large capacity, or by a flexible drive which may come from the engine of the tractor vehicle for the purpose of actuating the reducing gear. It is expedient, however, in the case of a trailer to take into account operation of the arrangement by means which are independent of the engine of the tractor, as the trailer may be left on the site while the tractor is removed for use elsewhere.

The internal arrangement of the body is, of course, independent of the subject matter of the invention. It comprises show cases, stands and the like adapted for displaying or holding for display purposes the articles to be exhibited or offered for sale.

The tubes 32, which form the racks, in combination with the gear wheels 39, might be replaced by any other arrangement enabling a transverse pushing or pulling action to be exerted on the telescopic frames for the purpose of opening them out or again closing them. Thus it would be possible for this purpose to employ horizontal transverse jacks, which are themselves preferably provided with telescopic means or the like.

In the embodiments according to Figs. 3 to 7 there may be more than two box-like structures. The operation of the wheel or wheels 225, 225$^b$, 225$^c$ may be other than by means of a worm, for example by means of pairs of bevel gears, either on the upper faces of the box-like structures as shown or, if desired, below the same.

The supporting and operating members 221, 221$^a$, 221$^b$, 221$^c$, instead of being constituted by cylindrical tubes, might also be in the form of girders of T-section or double T-section, box girders or the like.

For the sake of simplification the movable portions in the embodiments according to Figs. 3 to 7 have not been shown as being telescopic, but it will be understood that the improvements described also apply in their entirety to telescopic movable portions of the kind referred to in the preceding embodiments.

It is possible, without departing from the scope of the invention, to provide a telescopic or like arrangement not only laterally but also endwise of the vehicle at one of its two ends, this arrangement then permitting of a lengthening of the body.

It will be understood that the invention can be applied to any type of vehicle, such as a lorry, van, truck or the like, in all cases in which it is desired to have available an additional useful area.

Having now described my invention what I claim as new and desire to secure by Letters Patent is:

In a vehicle having a chassis and body thereon including fixed and telescopic body portions, the combination of at least one housing mounted transversely on said chassis below said body, said housing adapted to be mounted on said chassis and forming a sill for the support of said fixed body portion, a pair of rack members disposed within said housing, said members being tubular and having a series of equidistantly spaced perforations along their opposite faces for engagement with the teeth of a driving gear, said members having their axes lying in a substantially horizontal plane with respect to one another, each of said rack members having a portion projecting through said housing on opposite ends thereof, said projecting portions adapted to be connected to said telescoping body portions, a pinion supported between said rack members and in driving engagement therewith, rollers within said housing for supporting said racks, and means for driving said pinion comprising an operating shaft supported by the vehicle, an endless screw on said shaft, a gear driven by said screw, said gear driving said pinion by means of a second shaft connecting the two, said screw, gear and second shaft being enclosed within a casing, said casing being supported above and partially extending into said housing, portions of said casing forming supporting bearings for the second shaft.

References Cited in the file of this patent

UNITED STATES PATENTS

| 1,436,984 | Follett | Nov. 28, 1922 |
|---|---|---|
| 1,521,635 | Lewis | Jan. 6, 1925 |
| 1,852,984 | Smith | Apr. 5, 1932 |
| 1,964,894 | Rohne | July 3, 1934 |
| 2,168,069 | Miller | Aug. 1, 1939 |
| 2,225,319 | Rollo | Dec. 17, 1940 |

FOREIGN PATENTS

| 184,915 | Great Britain | Aug. 31, 1922 |
|---|---|---|
| 304,802 | Great Britain | Jan. 28, 1929 |